(12) United States Patent
Chen

(10) Patent No.: US 9,137,137 B2
(45) Date of Patent: Sep. 15, 2015

(54) METHOD AND NETWORK DEVICE FOR LOOP DETECTION

(71) Applicant: ACCTON TECHNOLOGY CORPORATION, Hsinchu (TW)

(72) Inventor: Ya-Chi Chen, Taichung (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 138 days.

(21) Appl. No.: 14/080,204

(22) Filed: Nov. 14, 2013

(65) Prior Publication Data

US 2014/0204768 A1 Jul. 24, 2014

(30) Foreign Application Priority Data

Jan. 24, 2013 (TW) .............................. 102102600 A

(51) Int. Cl.
*H04L 12/16* (2006.01)
*H04L 12/26* (2006.01)

(52) U.S. Cl.
CPC ................ *H04L 43/50* (2013.01); *H04L 43/10* (2013.01)

(58) Field of Classification Search
CPC ................................ H04L 43/10; H04L 43/50
USPC .................................................. 370/241, 244
See application file for complete search history.

(56) References Cited

U.S. PATENT DOCUMENTS

| | | | |
|---|---|---|---|
| 7,911,982 B1 * | 3/2011 | Dalvi et al. .................... 370/256 |
| 8,139,584 B2 | 3/2012 | Suzuyama et al. |
| 2005/0254490 A1 | 11/2005 | Gallatin et al. |
| 2006/0013141 A1 * | 1/2006 | Mutoh et al. .................. 370/241 |
| 2006/0285499 A1 | 12/2006 | Tzeng |
| 2007/0171814 A1 * | 7/2007 | Florit et al. .................... 370/216 |
| 2009/0219821 A1 * | 9/2009 | Kamachi et al. .............. 370/242 |
| 2011/0128863 A1 * | 6/2011 | Hsieh et al. .................... 370/249 |
| 2011/0134760 A1 * | 6/2011 | Kamachi et al. .............. 370/242 |
| 2012/0060209 A1 * | 3/2012 | Leu .................................. 726/7 |
| 2012/0257627 A1 * | 10/2012 | Nguyen et al. ................. 370/392 |
| 2013/0003601 A1 * | 1/2013 | Gupta et al. ................... 370/254 |
| 2013/0223214 A1 * | 8/2013 | Takaoka et al. ............... 370/230 |
| 2014/0050099 A1 * | 2/2014 | Lin et al. ........................ 370/241 |
| 2014/0355421 A1 * | 12/2014 | Zhang et al. ................... 370/225 |
| 2015/0103674 A1 * | 4/2015 | Ramesh et al. ............... 370/244 |

FOREIGN PATENT DOCUMENTS

TW 200516906 A 5/2005

* cited by examiner

*Primary Examiner* — Chi H Pham
*Assistant Examiner* — Robert Lopata
(74) *Attorney, Agent, or Firm* — Birch, Stewart, Kolasch & Birch, LLP

(57) ABSTRACT

A method for loop detection and a network device applying such method are provided. The method includes: receiving, by a port, a loop detection frame; detecting, by a loop detection unit, whether the loop detection frame is transmitted via a port of the network device; analyzing, by a frame analyzer unit, the loop detection frame when the loop detection frame is transmitted via the port, and determining whether there is any loop in the network device; and shutting down the port of the network device or not perform any action, by a port switching unit when the frame analyzer unit determines that there is a loop in the network device, wherein the loop detection frame is a loop detection protocol data unit (LDPDU) frame.

18 Claims, 6 Drawing Sheets

METHOD AND NETWORK DEVICE FOR LOOP DETECTION

CROSS REFERENCE TO RELATED APPLICATIONS

This Application claims priority of Taiwan Patent Application No. 102102600, filed on Jan. 24, 2012, the entirety of which is incorporated by reference herein.

BACKGROUND OF THE INVENTION

1. Field of the Invention

The present invention relates to a method and network device for loop detection, and in particular to a method and network device for determining whether a loop is occurred in the network by using a loop detection frame.

2. Description of the Related Art

Ethernet network is a common local area network (LAN) technology. In a large-scale local area network, a loop may be formed between two or more bridges, such as switches. A packet may be transmitted repeatedly or flooded within the loop, not only occupying the bandwidth of the network and consuming the resources of the network device, such as memory resources, but also deteriorating the efficiency of the network and the operation effect of the device.

Referring to FIG. 1A and FIG. 1B, two kinds of loops formed in the LAN are shown respectively. In FIG. 1A, the packet 14 transmitted from a port 101 of a device 10 may be sent back by a device 12 via a switch (not shown in FIG. 1), hence forming a loop. In FIG. 1B, the packet 14 transmitted from a port 101 of a device 10 may be sent to another port 102 by a device 12 via a switch (not shown in FIG. 1), hence forming a loop.

Currently, the Spanning Tree Protocol (STP) is used primarily to resolve problems caused by the loop according to IEEE 802.1. When a loop is occurred, some links on the loop will be cut off by disabling port(s) of the switch, so as to break the loop. However, it is costlier to support the spanning tree protocol by hardware. If the spanning tree protocol is supported by software, then the computing unit of the device or the switch demands higher program computing capability. However, some devices or switches merely configure an Application Specified Integrated Circuit (ASIC) which has no program computing capability to handle the packet, so the Spanning Tree Protocol is incomplete for all kinds of devices or switches.

BRIEF SUMMARY OF THE INVENTION

A detailed description is given in the following embodiments with reference to the accompanying drawings.

Methods and network devices for loop detection are provided.

In one exemplary embodiment, the disclosure is directed to a method for loop detection. The method is used in a network device, and comprises following steps: receiving a loop detection frame by a port; detecting and determining whether the loop detection frame is transmitted via the port by a loop detection module; and analyzing the loop detection frame and determining whether a loop is occurred in the network device by the loop detection module when the loop detection frame is transmitted via the port, wherein the loop detection module shuts down the port which transmits the loop detection frame when the loop is occurred, or the loop detection module drops the loop detection frame when the loop is not occurred.

In one exemplary embodiment, the disclosure is directed to a network device. The network device comprises: at least a port, a loop detection module, wherein the a loop detection module comprises a loop detection unit, a frame analysis unit and a port switching unit. The port is configured to receive a loop detection frame. The loop detection unit comprising a loop detection unit, a frame analysis unit and a port switching unit, wherein the loop detection unit is coupled to the port and detects whether the loop detection frame is transmitted from the port; the frame analysis unit is coupled to the loop detection unit, the frame analysis unit analyzes the loop detection frame and determines whether a loop is occurred in the network device when the loop detection frame is transmitted via the port; and the port switching unit is coupled to the port and the frame analysis unit, the port switching unit shuts down the port when the loop is occurred and drops the loop detection frame when the loop does not occur.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
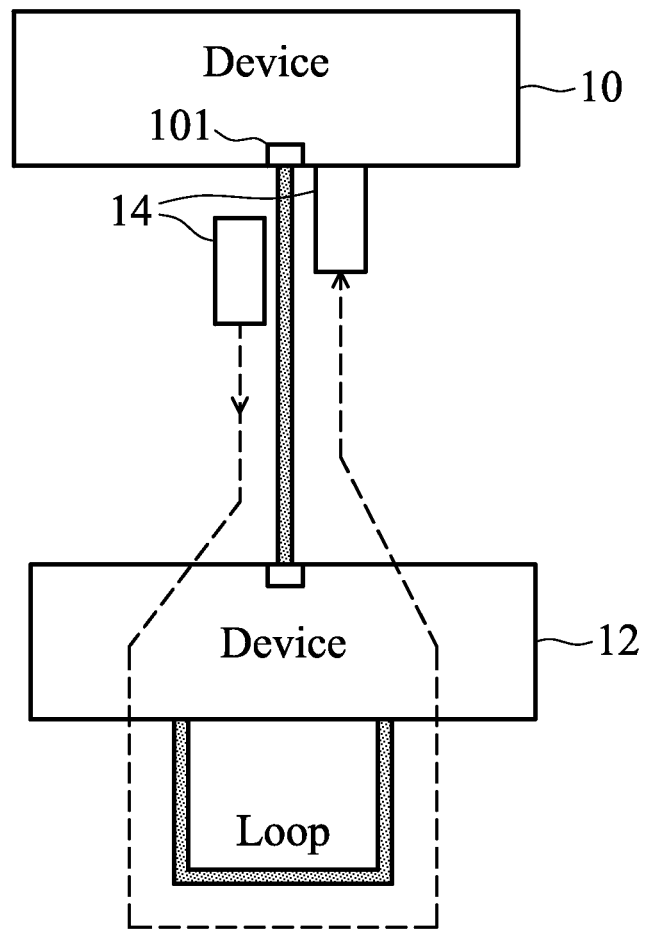
FIG. 1A and FIG. 1B are schematic views illustrating the prior art of two kinds of loops formed in a local area network, respectively.
Figure 1B:
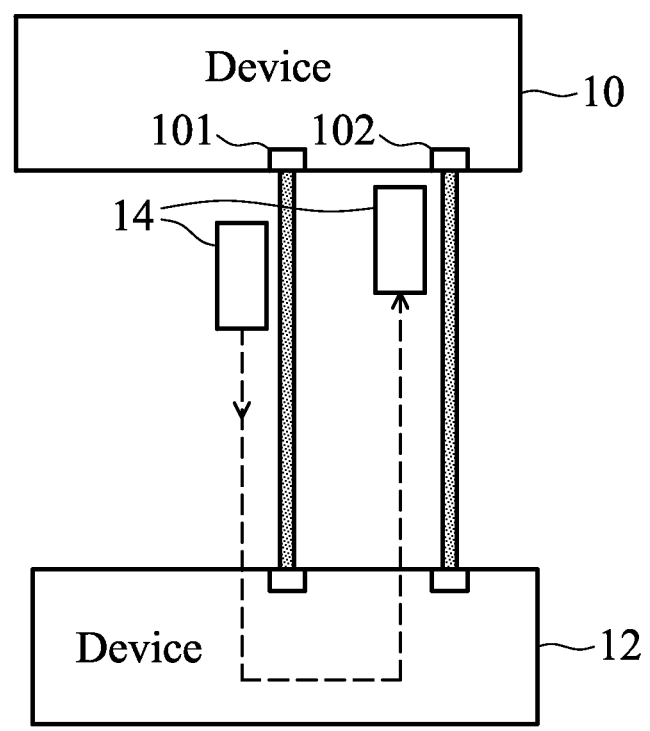
Figure 2:
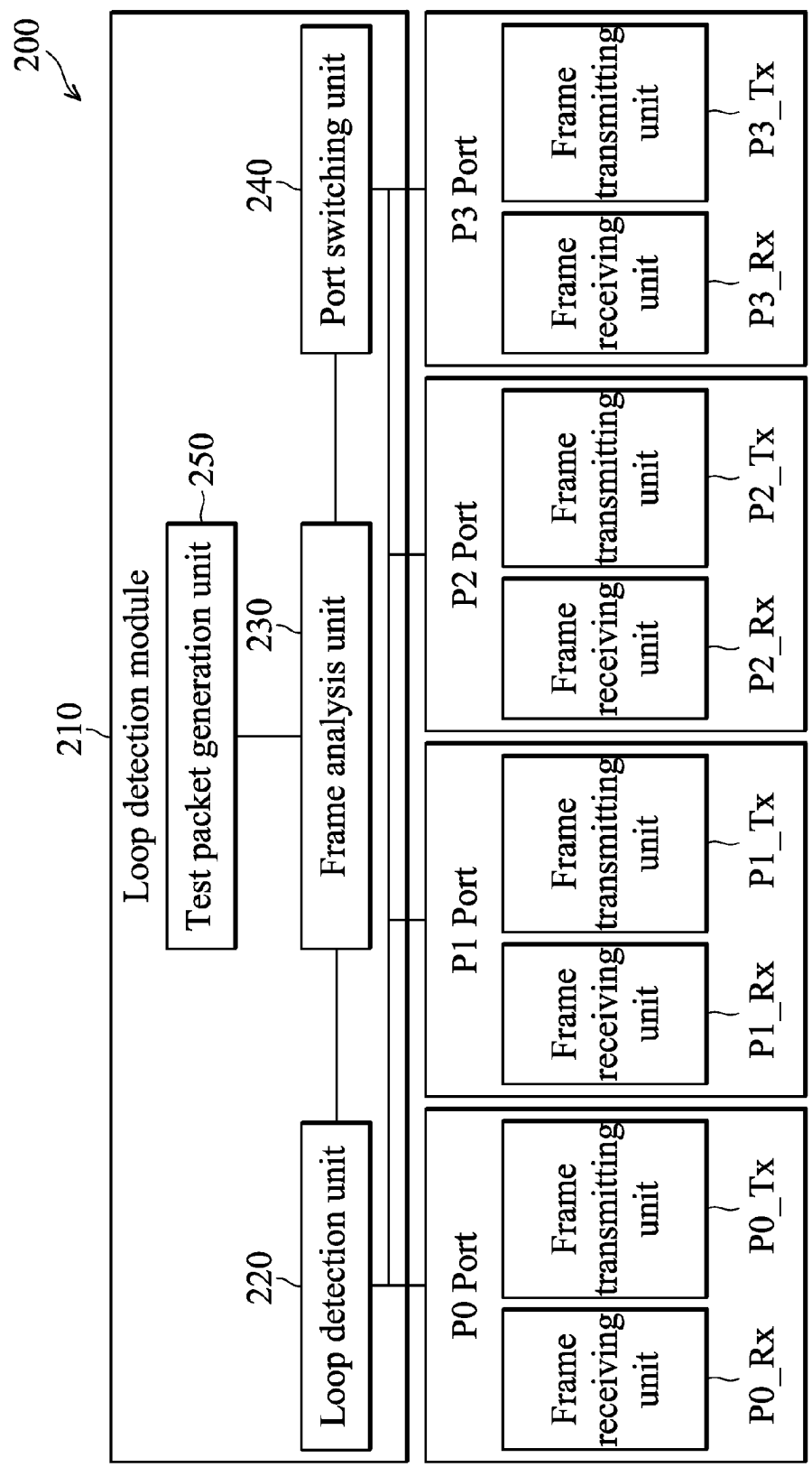
FIG. 2 is a block diagram of a network device according to an embodiment of the present invention.

FIG. 2 is a block diagram of a network device 200 according to an embodiment of the present invention. The network device 200 may be a wired/wireless switch, router, access point (AP) and other bridge, or other network device which can flood a data packet, but the present invention is not limited thereto. The network device 200 comprises a loop detection module 210 and a plurality of ports P0, P1, P2, and P3. The loop detection module 210 further comprises a loop detection unit 220, a frame analysis unit 230, a port switching unit 240, and a test packet generation unit 250. The ports P0, P1, P2, and P3 all comprise a frame receiving unit Rx and a frame transmitting unit Tx. The ports P0, P1, P2, and P3 are coupled to the loop detection unit 220 and the port switching unit 240, and a frame analysis unit 230 is coupled to the loop detection unit 220, the port switching unit 240 and the test packet generation unit 250. It should be noted that the number of ports in the invention is not limited. A single port can also be applied to the network device 200, and the loop would be occurred not only between several network devices but also between the ports of a single network device.

When the loop detection module 210 in the embodiment is implemented with hardware on a medium access control (MAC) layer, the loop detection module 210 can be a central processing unit (CPU) with computation ability, such as a microprocessor, a microcontroller or a field programmable gate array (FPGA). The loop detection unit 220, the frame analysis unit 230, the port switching unit 240 and the test packet generation unit 250 can be implemented by software or firmware executed by the CPU. In other words, the units can be implemented by each functional unit of the CPU, or the loop detection module 210 in the embodiment can be a special application circuit without computation ability, and merely provide basic network functions related to receive, transmit, process, determine and control the packets, but it is not limited thereto.

In the embodiment, the network device 200 generates and transmits a loop detection protocol data unit (LDPDU) frame used as a loop detection frame to detect whether a loop is occurred. Table 1 is a frame specification of the loop detection frame according to an embodiment of the present invention. Each loop detection frame contains the following fields and the length of data byte corresponding to each field: destination address (DA), source address (SA), Ethernet type, protocol identifier (PID), port address, logical port number, digest key, padding, frame check sequence (FCS) and other fields, but the order and the length of the fields of the invention are not limited thereto.

The destination address field records the destination address of the loop detection frame, wherein the destination address is an unknown unicast address. The source address field records the source address of the network device transmitting the loop detection frame, wherein the content of the source address field is the Media Access Control (MAC) address of the network device. The Ethernet type field indicates the type of the loop detection frame. The default value of the protocol identifier field is 00-01. The port address field records the MAC address of the port which transmits the loop detection frame. The logical port number field records the port number of the port which transmits the loop detection frame. The digest key records a digest key of the network device, wherein the digest key is calculated by the HMAC-MD5 algorithm during the boot time of the network device, and therefore the digest keys of different network devices are not the same. If the digest key field of the loop detection frame is consistent with the digest key field of the network device, the network device can confirm that the loop detection frame is transmitted from the network device. The padding field and the FCS field are set by the manufacturer of the network device 200.

words, after the loop detection function of the network device 300 is enabled, the function of transmitting the loop detection frame still has to be enabled by each port so that the test packet generation unit 350 may generate and transmit the loop detection frame for each port via the frame transmitting unit Tx of the port to execute the loop detection function and determine whether the loop is occurred. It is worth noting that it is presupposed that the network device 200 mentioned in the aforementioned embodiment provides the loop detection function, and the function of transmitting the loop detection frame of each port is enabled. The technical contents of other functional units in FIG. 2 are similar to the units in FIG. 3, and therefore the network device 300 used is described below.

Table 2 illustrates a relationship between the entire state and the port state according to the present embodiment. When the network device 300 enables the loop detection function and at least one port enables the function of transmitting the loop detection frame, the network device 300 may execute the loop detection function. If the network device 300 does not enable the loop detection function, or the port does not provide or enable the loop detection function, the network device 300 fails to execute the loop detection function. It should be noted that the technical content of the entire state detection unit 360 and the port state detection unit 370 are similar to the functional units described above, so the details related to the functions of the units will be omitted.

However, even though the network device 300 in the embodiment does not execute the loop detection function because the function of transmitting the loop detection frame is not enabled, the network device 300 may still receive and recognize the loop detection frame but not determine whether the loop is occurred. Therefore, when receiving the loop detection frame, the network device 300 still determines the source where the loop detection frame comes from. If the loop detection frame comes from the network device 300, namely, the SA field of the loop detection frame is consistent with the MAC address of the network device 300, the network device 300 may consider the loop detection frame an error and drop the loop detection frame because the network device 300 is not currently executing the loop detection function. Or when the loop detection frame comes from other network devices, namely, the SA field of the loop detection frame is different

TABLE 1

| Destination Address | Source Address | Ethernet Type | Protocol Identifier | port address | Logical Port Number | Digest Key | Padding | Frame Check Sequence |
|---|---|---|---|---|---|---|---|---|
| 6 | 6 | 2 | 2 | 6 | 4 | 16 | 18 | 4 |

Figure 3:
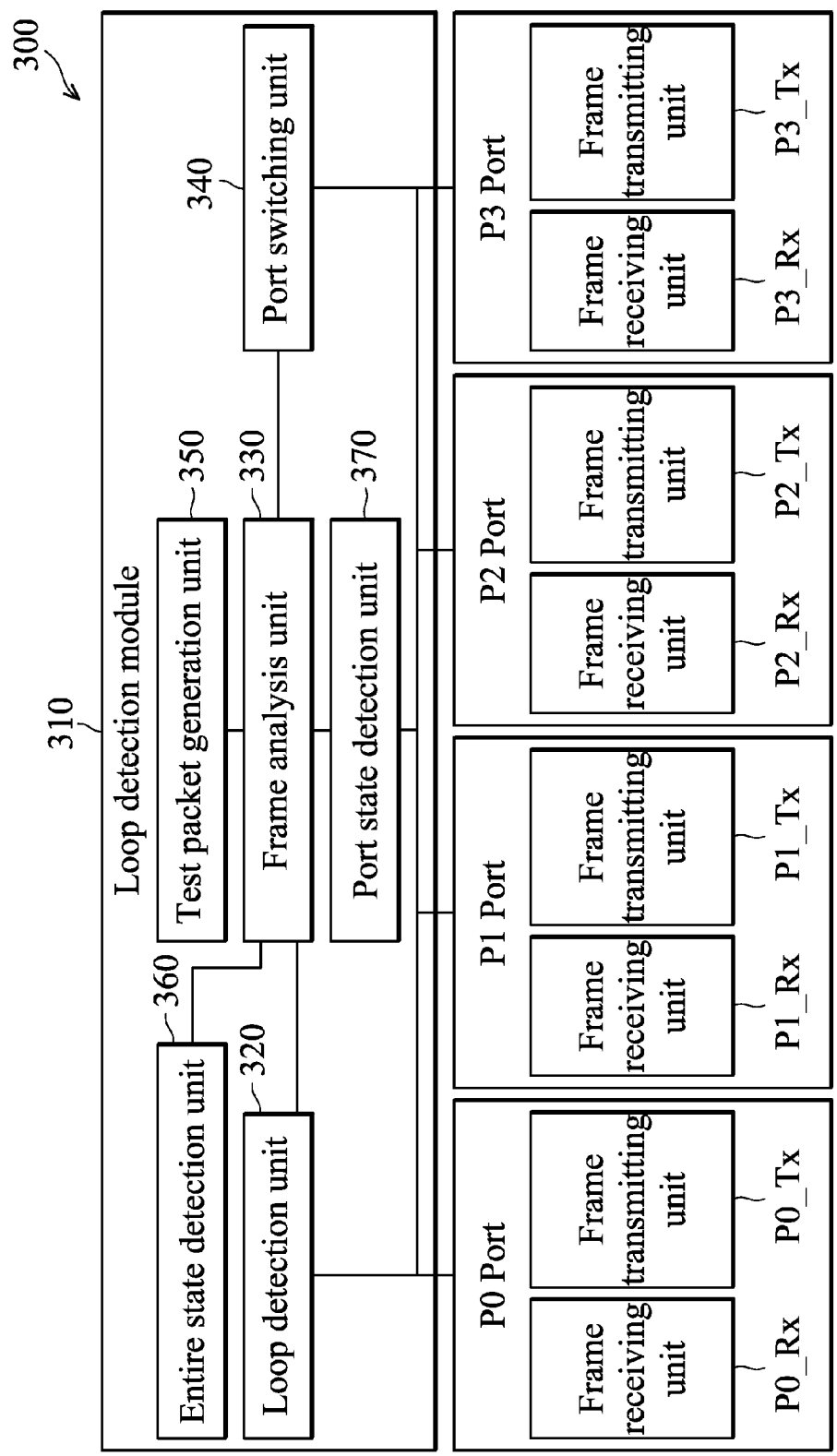
FIG. 3 is a block diagram of a network device according to another embodiment of the present invention.

As shown in FIG. 3, in another embodiment, the loop detection module 310 of the network device 300 also comprises an entire state detection unit 360 and a port state detection unit 370. The entire state detection unit 360 detects whether the network device 300 enables a loop detection function, and the port state detection unit 370 detects whether each port of the network device 300 provides and enables function of transmitting the loop detection frame. In other words from the MAC address of the network device 300, the network device 300 floods the loop detection frame to other network devices. In another embodiment, the network device 300 which enables the loop detection function and may transmit the loop detection frame by the port may further preset a predetermined time period, and therefore the test packet generation unit 350 may generate and transmit the loop detection frame periodically to detect whether the loop is occurred.

TABLE 2

| | | Port State: function of transmitting the loop detection frame by the port | |
|---|---|---|---|
| | | Enable | Disable |
| Entire State | Enable the loop detection function | 1. The port may transmit and receive the loop detection frame.<br>2. The network device may execute the loop detection function. | 1. The port may not transmit or receive the loop detection frame.<br>2. The network device may not execute the loop detection function.<br>3. If the loop detection frame received by the network device comes from the network device, the network device drops the loop detection frame. If the loop detection frame received by the network device comes from other network devices, the network device floods the loop detection frame. |
| | Disable the loop detection function | 1. The port may not transmit but may receive the loop detection frame.<br>2. The network device may not execute the loop detection function.<br>3. If the loop detection frame received by the network device comes from the network device, the network device drops the loop detection frame. If the loop detection frame received by the network device comes from other network devices, the network device floods the loop detection frame. | 1. The port may not transmit but may receive the loop detection frame.<br>2. The network device may not execute the loop detection function.<br>3. If the loop detection frame received by the network device comes from the network device, the network device drops the loop detection frame. If the loop detection frame received by the network device comes from other network devices, the network device floods the loop detection frame. |

It is worth noting that in the virtual network environments, when the loop detection frame is flooded through the port connected to the network device, the loop detection frame has to be tagged with a tag of the virtual network, otherwise it may not recognize which virtual network the loop detection frame belongs to. In addition, the ports connected to the network device may also determine that the loop detection frame should be tagged or untagged with the tag according to the relationship between the connected ports and the virtual networks.

Table 3 illustrates an entire state according to an embodiment of the present invention, and includes the relationships regarding whether the loop detection function is enabled, the source of the loop detection frame and how to handle the loop detection frame. When the network device 300 receives the loop detection frame from other network device, the network device 300 floods the loop detection frame according to a Virtual Local Area Network (VLAN) rule no matter what the VLAN tag the loop detection frame is tagged with. For example, the loop detection frame may be flooded to another port in the same VLAN. When the network device 300 receives the loop detection frame from itself and does not execute the loop detection function, the network device 300 drops the loop detection frame. When executing the loop detection function, the network device 300 further checks the loop detection frame to determine whether the loop is occurred. If a network device does not support the loop detection function of the invention (namely, the network device may not recognize the received loop detection frame and merely considers the received loop detection frame as a data signal), the network device does not detect the content of the received loop detection frame and floods the loop detection frame directly.

TABLE 3

| | | | Loop detection function of the network device | | |
|---|---|---|---|---|---|
| | | | Not Support | Disable | Enable |
| The source of the loop detection frame and the handling of the tag | Network Device | Untag with the tag | Flood | Drop | Check |
| | | Tag with the tag | Flood | Drop | Check |
| | Other Network Device | Untag with the tag | Flood | Flood | Flood |
| | | Tag with the tag | Flood | Flood | Flood |

When the network device 300 receives the loop detection frame via a frame receiving unit Rx of one of the ports P0, P1, P2 and P3, the loop detection unit 320 analyzes whether the SA field of the loop detection frame is consistent with the MAC address of the network device 300, determines whether the received loop detection frame is transmitted from the network device 300, and determines whether the received loop detection frame is transmitted from one of the ports P0, P1, P2 and P3 of the network device 300 according to the logical port number field.

When the loop detection frame is transmitted from one of the ports P0, P1, P2 and P3 of the network device 300, the frame analysis unit 330 further analyzes the loop detection frame. In another embodiment, the frame analysis unit 330 further analyzes the Ether_Type field, the port address field and the digest key field. When the Ether_Type field of the loop detection frame is consistent with the configuration data of the network device 300, the port address field of the loop detection frame is consistent with the MAC address of the port which transmits the loop detection frame, and the digest key field of the loop detection frame is consistent with a digest key generated by the network device 300, the frame analysis unit 330 determines that the loop is occurred in the network device 300.

When the frame analysis unit 330 determines that the loop is occurred in the network device 300, the port switching unit 340 executes one of two kinds of actions which are pre-set in advance by the user. One is to shut down the port which transmits the loop detection frame, wherein the port comprises the frame transmitting unit Tx and the frame receiving unit Rx. The other one is to maintain the current condition, and to not perform any action on the network device.

In an embodiment of the present invention, when the loop is occurred in the network device 300, the test packet generation unit 350 further transmits a test packet to notify the user when the loop is occurred in the network device 300. In another embodiment, the user may preset the loop detection module 210, 310 to check the destination address field, the source address (SA) field and the protocol identifier field in advance to reduce the burden on the subsequent computation and processing when detecting the loop.

In one embodiment, each frame receiving unit Rx and frame transmitting unit Tx of the port P0, P1, P2 and P3 are implemented in the physical layer of the network device 300. The loop detection frame transmitted from the network device 300 is further transmitted to other network devices through the frame transmitting unit Tx. The frame from the physical layer is received by the frame receiving unit Rx and is transmitted to the loop detection unit 320. A bus between the frame receiving unit Rx, the frame transmitting unit Tx and the loop detection unit 320 may be a high speed bus, but the present invention is not limited thereto.

Figure 4A:
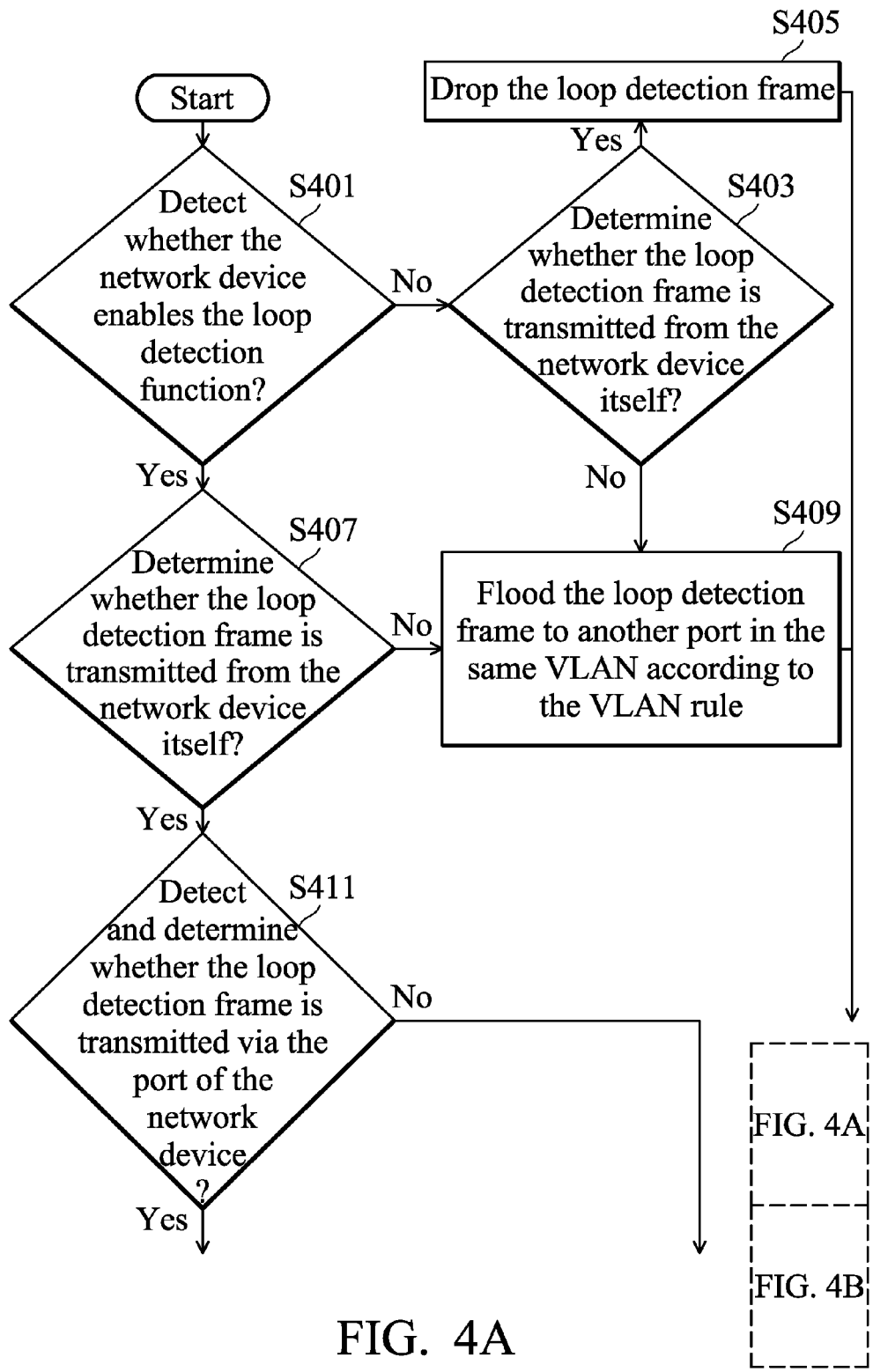
FIG. 4A~4B are flow diagrams illustrating the method for loop detection according to an embodiment of the present invention.
Figure 4B:
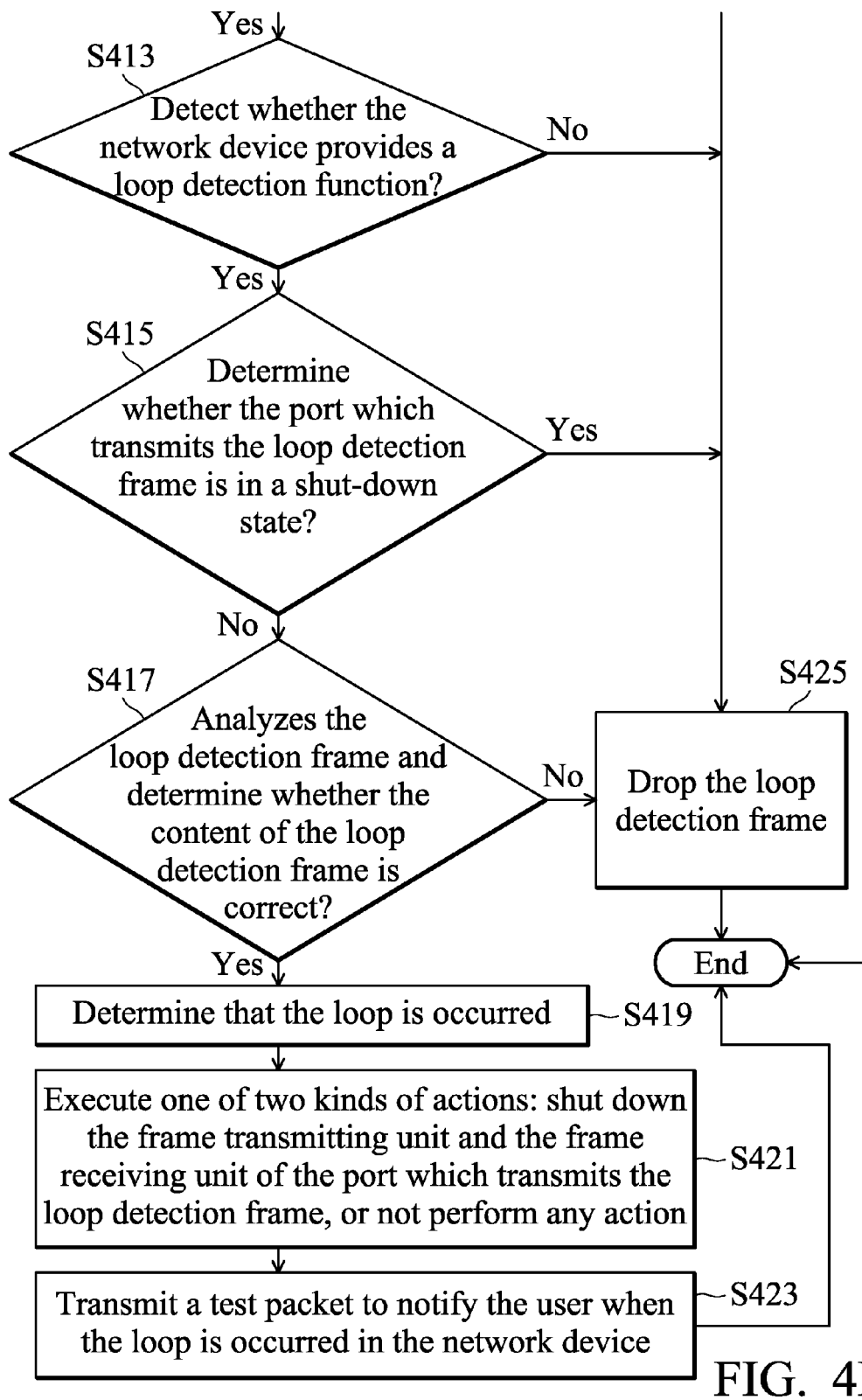

FIG. 4A-4B are flow diagrams illustrating the method for loop detection according to an embodiment of the present invention. When the network device receives a LDPDU frame by a port and considers the LDPDU frame as a loop detection frame, in step S401, the entire state detection unit detects whether the network device enables the loop detection function. If the network device does not enable the loop detection function ("No" in step S401), in step S403, the loop detection unit of the network device further determines whether the loop detection frame is transmitted from the network device itself. When the loop detection frame is transmitted from the network device itself ("Yes" in step S403), in step S405, the loop detection unit drops the loop detection frame. When the loop detection frame is transmitted from other network devices, ("No" in step S403), in step S409, the loop detection unit floods the loop detection frame to another port in the same VLAN according to a VLAN rule. If the network device enables the loop detection function ("Yes" in step S401), in step S407, the loop detection unit of the network device further determines whether the loop detection frame is transmitted from the network device itself. If the loop detection frame is transmitted from another network device ("No" in step S407), in step S409, the loop detection unit floods the loop detection frame to another port in the same VLAN according to the VLAN rule. If the loop detection frame is transmitted from the network device itself ("Yes" in step S407), in step S411, the loop detection unit detects and determines whether the loop detection frame is transmitted via the port of the network device. When the loop detection frame is not transmitted via the port of the network device ("No" in step S411), in step S425, the loop detection unit drops the loop detection frame. When the loop detection frame is transmitted via the port of the network device ("Yes" in step S411), in step S413, the port state detection unit detects whether the network device provides a loop detection function. When the network device does not set the loop detection function ("No" in step S413), in step S425, the port state detection unit drops the loop detection frame.

When the network device provides the loop detection function ("Yes" in step S413), in step S415, the port state detection unit determines whether the port which transmits the loop detection frame is in a shut-down state, namely whether the function of transmitting the loop detection frame by the port is enabled. When the port which transmits the loop detection frame is in the shut-down state ("Yes" in step S415), the port is shut down. Even though the loop may occur because the function of transmitting the loop detection frame is enabled, the port is shut down currently and no loop is occurred. Therefore, in step S425, the loop detection unit drops the loop detection frame.

When the port which transmits the loop detection frame is not in the shut-down state ("No" in step S415), the step S417 is executed. It should be noted that, in step S413 and the step S415 of the embodiment, the order of the mechanism for determining the state of the port may be changed randomly, and the invention is not limited thereto. The default related functions described above in the embodiments are enabled, and therefore the step 401, the step 413 and the step 415 may be skipped and the step 407 and the step 417 may be executed directly.

In step S417, the frame analysis unit analyzes the loop detection frame; meaning that the frame analysis unit further analyzes the Ether_Type field, the port address field, and the digest key field of the loop detection frame.

When the Ether_Type field analyzed by the frame analysis unit is not consistent with the configuration data of the network device, or the port address field is not consistent with a media access control (MAC) address of the port which transmits the loop detection frame, or the digest key field is not consistent with a digest key generated by the network device (namely, at least one the field is not consistent in the comparison results) ("No" in step S417), in step S425, the frame analysis unit determines that the loop does not occur and drops the loop detection frame. On the other hand, if the three fields are consistent with the comparison results ("Yes" in step S417), in step S419, the frame analysis unit determines that the loop is occurred.

When the frame analysis unit determines that the loop is occurred, in step S421, the port switching unit may execute one of two actions according to the preset of the user: shut down the frame transmitting unit Tx and the frame receiving unit Rx of the port which transmits the loop detection frame, or do not perform any action.

In step S423, the test packet generation unit further transmits a test packet to notify the user when the loop is occurred in the network device, wherein the content of the test packet may be information about the loop is occurred, such as the port causing the loop, and whether to shut down the port process so that the user may decide on the subsequent processing according to the test packet.

Due to the requirement the hardware not be extensive, the method and the network device for loop detection in this invention merely needs the basic functioning of the network devices, such as, the processing, determination and control of the packet. Therefore, the method and the network device for loop detection in this invention may be adaptable to all network devices and may achieve the effect of detecting the loop effectively no matter whether the network device has a central processing unit or computation ability.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for loop detection which used in a network device, the method comprising following steps:
   receiving a loop detection frame by a port;
   detecting and determining whether the loop detection frame is transmitted via the port by a loop detection module; and
   analyzing the loop detection frame and determining whether a loop is occurred in the network device by the loop detection module when the loop detection frame is transmitted via the port,
   wherein the loop detection module shuts down the port which transmits the loop detection frame when the loop is occurred, or the loop detection module drops the loop detection frame when the loop is not occurred;
   the method further comprises the following steps:
      generating the loop detection frame by the loop detection module, wherein the loop detection frame comprises:
      a source address (SA) field;
      a Ether_Type field;
      a port address field;
      a logical port number field; and
      a digest key field, and
   wherein the loop detection module analyzes the Ether_Type field, the port address field, and the digest key field of the loop detection frame to determine whether the loop is occurred in the network device.

2. The method for loop detection as claimed in claim 1, further comprising the following steps:
   transmitting a test packet to notify user by the loop detection module when the loop is occurred in the network device.

3. The method for loop detection as claimed in claim 1, wherein when the Ether_Type field is consistent with a configuration data of the network device, the port address field is consistent with a media access control (MAC) address of the port, and the digest key field is consistent with a digest key of the network device, the loop detection module determines that the loop is occurred in the network device.

4. The method for loop detection as claimed in claim 1, wherein the detecting step further comprises: the loop detection module floods the loop detection frame according to a Virtual Local Area Network (VLAN) rule when the loop detection frame is not transmitted from the network device.

5. The method for loop detection as claimed in claim 3, wherein the detecting step further comprises: the loop detection module drops the loop detection frame when the loop detection frame is transmitted from the network device but not transmitted via the port.

6. The method for loop detection as claimed in claim 1, further comprising:
   determining whether the network device enables a loop detection function by the loop detection module; and
   dropping the loop detection frame by the loop detection module when the network device disables the loop detection function.

7. The method for loop detection as claimed in claim 1, further comprising:
   determining whether the port of the network device provides function of transmitting the loop detection frame by the loop detection module; and
   dropping the loop detection frame by the loop detection module when the port of the network device does not provide function of transmitting the loop detection frame.

8. The method for loop detection as claimed in claim 6, further comprising:
   determining whether the port of the network device enables the loop detection function by the loop detection module; and
   dropping the loop detection frame by the loop detection module when the port of the network device disables to transmit the loop detection function.

9. The method for loop detection as claimed in claim 1, further comprising:
   generating the loop detection frame in a predetermined time period by the loop detection module; and
   transmitting the loop detection frame by the port.

10. A network device, comprising:
    a port, configured to receive a loop detection frame;
    a loop detection module, comprising a loop detection unit, a frame analysis unit and a port switching unit,
    wherein the loop detection unit is coupled to the port and detects whether the loop detection frame is transmitted from the port;
    the frame analysis unit is coupled to the loop detection unit, the frame analysis unit analyzes the loop detection frame and determines whether a loop is occurred in the network device when the loop detection frame is transmitted via the port;
    the port switching unit is coupled to the port and the frame analysis unit, the port switching unit shuts down the port when the loop is occurred and drops the loop detection frame when the loop does not occur; and
    the network device further comprises:
    a test packet generation unit, configured to generate the loop detection frame, wherein the loop detection frame comprises:
    a source address (SA) field;
    a Ether_Type field;
    a port address field;
    a logical port number field; and
    a digest key field, and
    wherein the frame analysis unit analyzes the Ether_Type field, the port address field, and the digest key field of the loop detection frame to determine whether the loop is occurred in the network device.

11. The network device as claimed in claim 10, the loop detection module further comprising:
    a test packet generation unit, coupled to the frame analysis unit and transmitting a test packet to notify user when the loop is occurred in the network device.

12. The network device as claimed in claim 10, wherein when the frame analysis unit determines that the Ether_Type field is consistent with configuration data of the network device, the port address field is consistent with a media access control (MAC) address of the port, and the digest key field is consistent with a digest key of the network device, the frame analysis unit determines that the loop is occurred in the network device.

13. The network device as claimed in claim 10, wherein the loop detection unit floods the loop detection frame according to a Virtual Local Area Network (VLAN) rule when the loop detection frame is not transmitted from the network device.

14. The network device as claimed in claim 13, wherein the loop detection unit drops the loop detection frame when the loop detection frame is transmitted from the network device but not transmitted via the port.

15. The network device as claimed in claim 10, the loop detection module further comprising:
   an entire state detection unit, configured to detect whether the network device enables a loop detection function, and drop the loop detection frame when the network device disables the loop detection function.

16. The network device as claimed in claim 10, the loop detection module further comprising:
   a port state detection unit, configured to detect whether the port of the network device provides function of transmitting the loop detection frame, and the port state detection unit drops the loop detection frame when the port of the network device does not provide function of transmitting the loop detection frame.

17. The network device as claimed in claim 16, wherein the port state detection unit further detects whether the port of the network device enables the loop detection function, and the network device drops the loop detection frame when the port of the network device disables to transmit the loop detection function.

18. The network device as claimed in claim 17, further comprising:
   a test packet generation unit, configured to generate the loop detection frame in a predetermined time period to continue detecting whether the loop is occurred in the network device.

* * * * *